Figure 3:
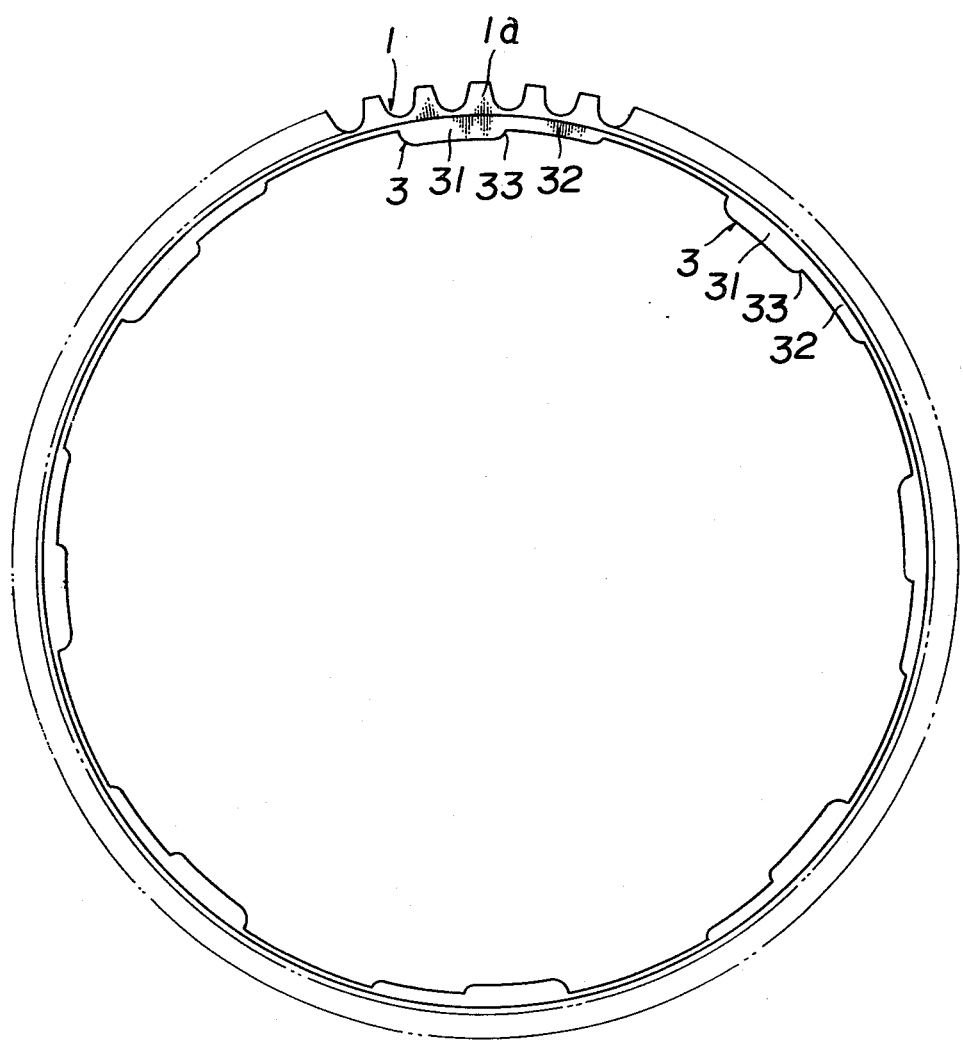

United States Patent [19]

Segawa

[11] 4,439,172
[45] Mar. 27, 1984

[54] CHAIN GEAR AND CRANK MOUNTING ASSEMBLY

[75] Inventor: Takashi Segawa, Sakai, Japan

[73] Assignee: Shimano Industrial Company Limited, Osaka, Japan

[21] Appl. No.: 249,476

[22] Filed: Mar. 31, 1981

Related U.S. Application Data

[63] Continuation of Ser. No. 972,372, Dec. 22, 1978, abandoned.

[30] Foreign Application Priority Data

Dec. 28, 1977 [JP] Japan .................. 52-157659
Feb. 27, 1978 [JP] Japan .................. 53-25550

[51] Int. Cl.³ ............... F16H 55/30; F16H 55/12
[52] U.S. Cl. ................... 474/160; 474/144; 74/594.2; 74/447
[58] Field of Search ............ 74/594.2, 439, 446, 74/447; 474/160, 144

[56] References Cited

U.S. PATENT DOCUMENTS

| | | |
|---|---|---|
| 284,290 | 9/1883 | Gilliland . |
| 3,168,836 | 2/1965 | Militana . |
| 3,550,465 | 12/1970 | Maeda . |
| 3,919,898 | 11/1975 | Sugino . |
| 4,009,621 | 3/1977 | Segawa . |

FOREIGN PATENT DOCUMENTS

| | | |
|---|---|---|
| 983303 | 3/1949 | France . |
| 1013843 | 3/1950 | France . |
| 1029474 | 12/1950 | France . |
| 1256502 | 3/1954 | France . |
| 24-368792 | 6/1949 | Japan . |
| 26-14722 | 12/1951 | Japan . |
| 47-24120 | 7/1972 | Japan . |
| 921614 | 3/1963 | United Kingdom . |

*Primary Examiner*—Kenneth Dorner
*Attorney, Agent, or Firm*—Stevens, Davis, Miller & Mosher

[57] ABSTRACT

Disclosed is a crank for a bicycle, having a chain wheel mounted thereto by an adapter, the adapter having at least one annular member formed at the foremost ends of legs extending radially outwardly of a boss of the adapter and connecting the legs with each other and chain wheel mounting means provided at at least one of the leg and adapter.

4 Claims, 15 Drawing Figures

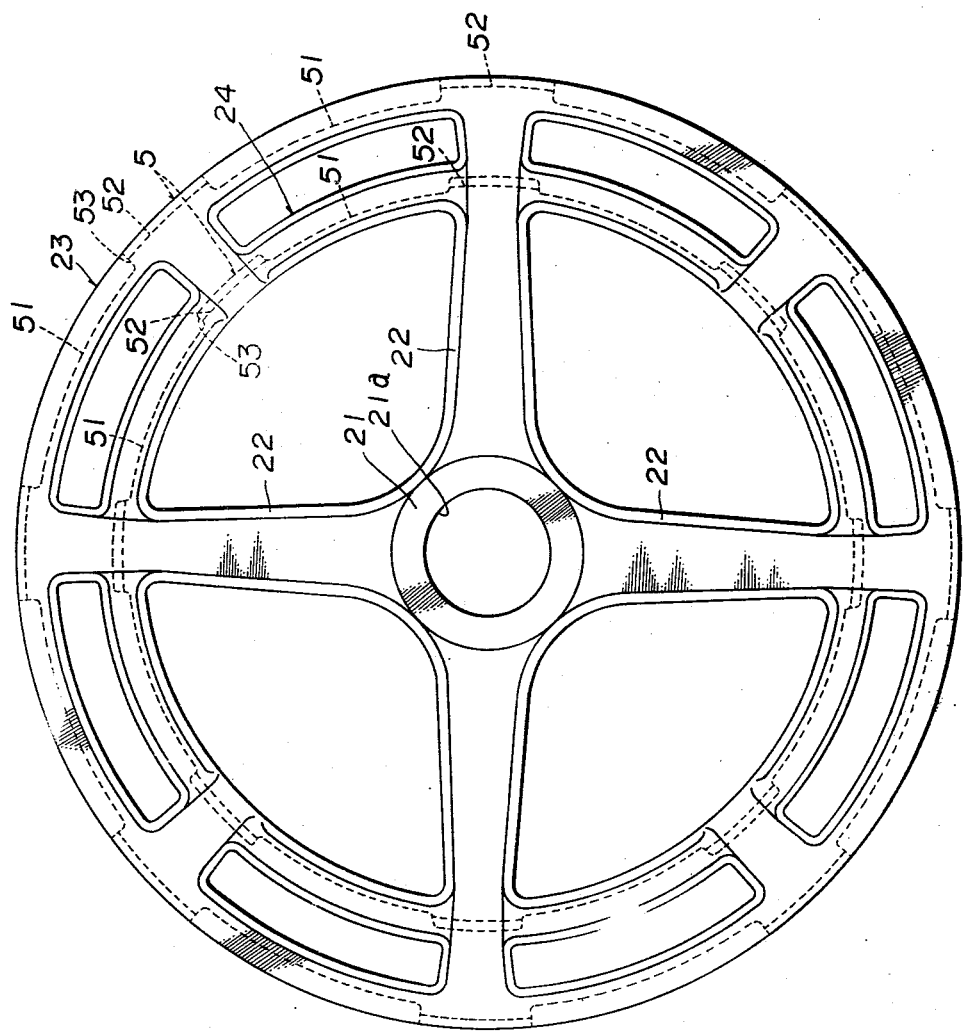
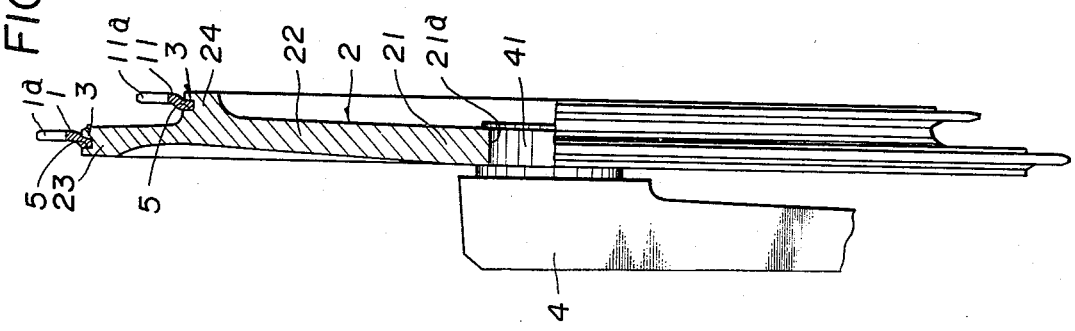

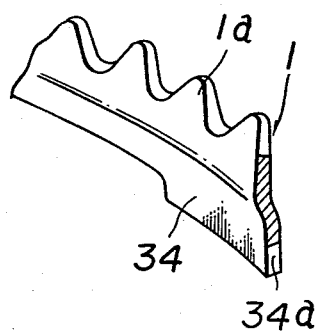
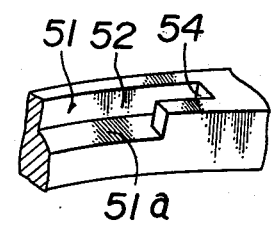
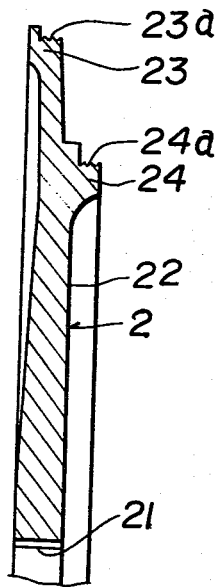
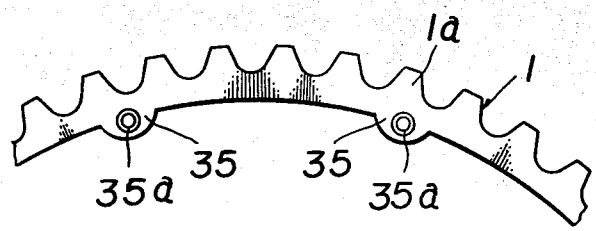

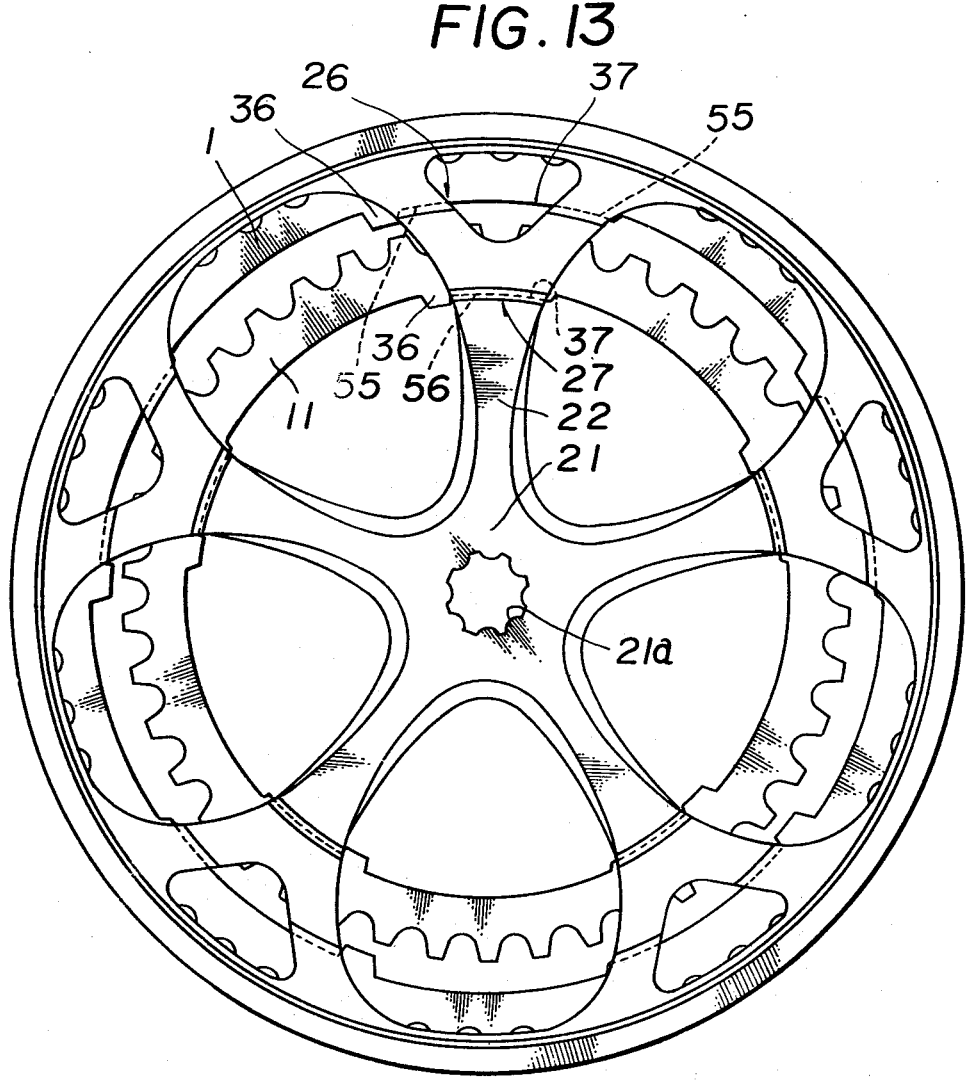

CHAIN GEAR AND CRANK MOUNTING ASSEMBLY

This is a continuation of application Ser. No. 972,372 filed Dec. 22, 1978, and now abandoned.

This invention relates to a chain wheel and crank for a bicycle and more particularly to a chain wheel (hereinafter called a chain gear) and crank for a bicycle, which comprises a crank arm, at least one chain gear and an adapter for mounting the chain gear to the crank arm.

Generally, a bicycle chain gear and crank are rotatably supported to a bicycle frame bracket lug and a driving chain is stretched across the chain gear and a freewheel at a rear hub of the bicycle, so rotation of the crank arms by pedalling causes driving movement of the bicycle.

This kind of chain gear and crank can be divided into two catagories. In the first the chain gear is directly attached to the crank shaft, and in the second the chain gear is attached to the crank shaft through an adapter mounted to the crank shaft.

Where the chain gear is directly mounted to the crank arm, a larger amount of material must be used to impart strength to the chain gear making it difficult to remove the chain gear from the crank for replacement or repair of a worn or damaged chain gear. In addition, the chain gear is provided with a portion thereof through which the gear is mounted to the crank shaft, thereby making the chain gear expensive.

This problem does not occur when the chain gear is mounted to the adapter. The crank shaft with an adapter, however, usually has a plurality of legs extending radially outwardly from a boss of the adapter, the legs carrying at the utmost ends thereof the chain gear, and being formed of light aluminum alloy to reduce its weight. As a result, the adapter lacks hardness and the chain gear and crank, as a whole, have durability problems.

Durability improves if the adapter is made of material, such as iron, of high hardness; however, when a high hardness material is employed weighs more and becomes expensive.

The invention has been designed to overcome these problems. Thus, a main object of the invention is to provide an adapter for mounting a chain gear to the crank for a bicycle, which does not have the problems of poor hardness and durabiity. That is, the invention provides a chain gear and crank combination having a high hardness and superior durability while being light in weight and inexpensive to produce.

Another object of the invention is to provide a chain gear and combination for a bicycle having a means permitting the mounting the chain gear to the adapter by a simple action.

The invention is characterized in that the adapter mounting the chain gear to the crank is provided with at least one annular member which is formed at the foremost end of a plurality of legs extending radially outwardly from the adapter boss and which connects the legs together, and by mounting means provided at at least one of the annular member and legs to mount the chain gear to the adapter.

Accordingly, the adapter, whose legs are connected by the annular member, has a very high hardness thereby improving the durability of the chain gear and crank. Moreover, the adapter may be made of a light alloy, such as an aluminum alloy, thereby making the chain gear and crank assembly light in weight and inexpensive to produce.

Figure 4:
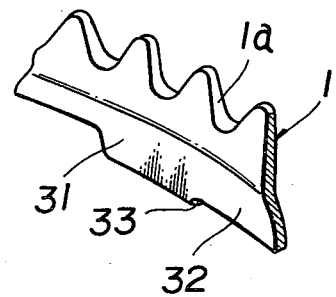
Figure 5:
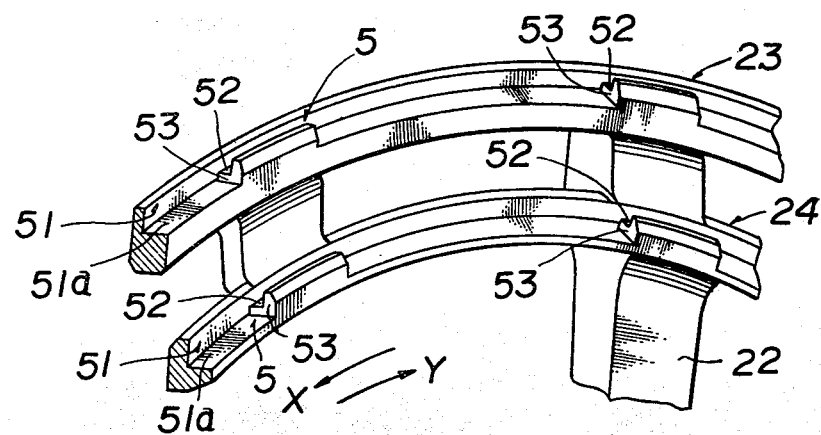
Figure 6:
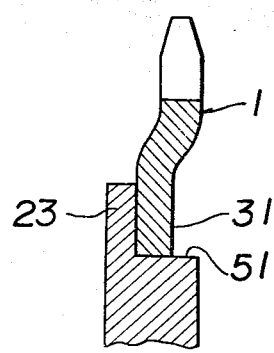
Figure 7:
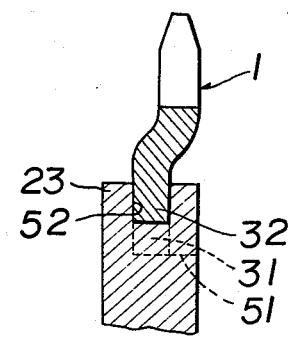
Figure 12:
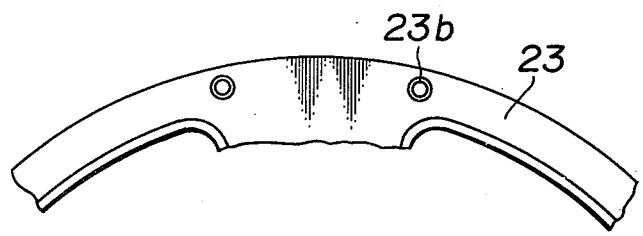
Figure 14:
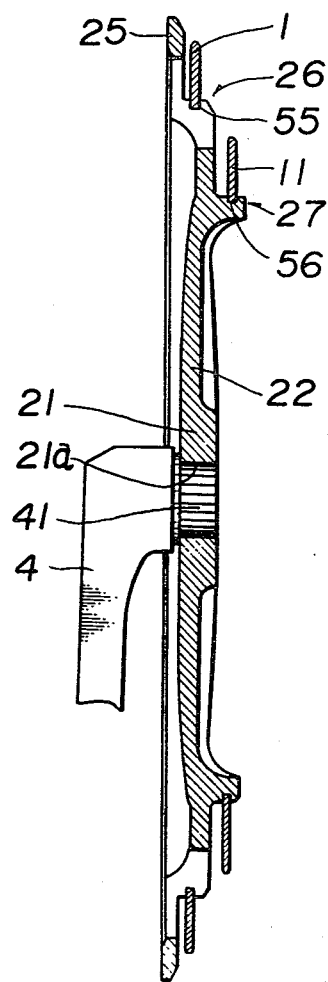
Figure 15:
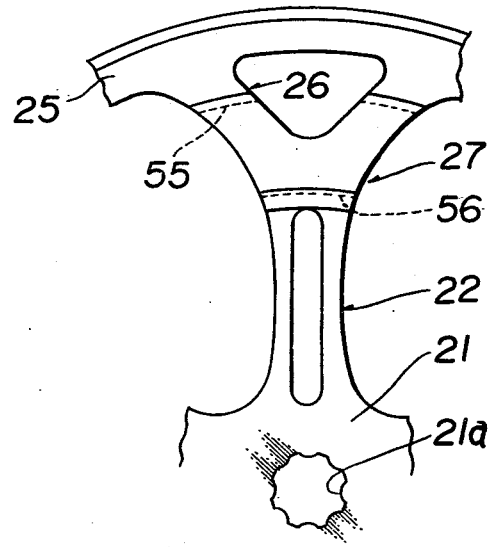

These and other objects and features of the invention will be more apparent upon a reading of the following detailed specification and drawings, in which:

FIG. 1 is a partially cutaway side view of the chain gear and crank of the invention, FIG. 2 is a front view of the adapter therefor, FIG. 3 is a front view of the chain gear of the invention, FIG. 4 is a partially perspective view thereof, FIG. 5 is a partially perspective view of the adapter in FIG. 3, FIGS. 6 and 7 are sectional views showing the mounting arrangement of the chain gear, FIGS. 8 through 12 are illustrations of modified embodiments for mounting the chain gear to the adapter, in which FIG. 8 is a partially perspective view of the chain gear in a modified embodiment of the mounting arrangement, FIG. 9 is a partially perspective view of the adapter thereof, FIG. 10 is a partially sectional view of the adapter of another modified embodiment of the mounting arrangement, FIG. 11 is a partially front view of the chain gear of a further modified embodiment thereof, FIG. 12 is a partially front view of the adapter thereof, FIG. 13 is a front view of a modified embodiment of the chain gear and crank of the invention, FIG. 14 is a longitudinally sectional view thereof, and FIG. 15 is a partially omitted rear view of the adapter only of the modified embodiment in FIG. 14.

Referring to the drawings, a two-stage chain gear and crank are shown, which comprise two chain gears 1 and 11 of different diameter and number of sprocket teeth which are mounted to an adapter 2. The chain gears 1 and 11 are selectively connected to a driving chain under control a front derailleur (not shown).

The chain gears 1 and 11 are made of a hard material of hardness, such as iron or its alloy, and are formed in annular shapes as shown in FIG. 3, and have at the outer peripheries a large number of teeth 1a and 11a and at the inner peripheries respective first mounting means 3 to be hereinafter described.

The adapter 2 is made of a light alloy, such as an aluminum alloy and, as shown in FIGS. 1 and 2, comprises a boss 21 having a bore 21a fitting onto a crank shaft 41, a plurality of legs 22 extending radially outwardly of the boss 21, and at least one of annular members 23 and 24 connecting the utmost ends of legs 22, where FIGS. 1 and 2 represent two annular members 23 and 24. The annular members 23 and 24 are provided with respective second mounting means, 5 for rigidly mounting the chain gears 1 and 11 thereto.

A single annular member may be used, but in any event, each annular member has a larger thickness than each of the chain gears 1 and 11 and it connects the legs 22, thereby retaining a high hardness for adapter 2.

Next, the structure for mounting the chain gears 1 and 11 to the adapter 2 will be detailed. Referring to FIGS. 1 through 7, the chain gears 1 and 11 have a plurality (eight in the drawing) of engaging projections 31 and 32, which extend radially inwardly from the inner peripheries of respective chain gears 1 and 11 as shown in FIGS. 3 and 4. The annular members 23 and 24 have notched portions 51 extending circumferentially about the outer periphery thereof, the notched portions 51 being formed on one thicknesswise side of each of the annular members, and have grooves 52 insertably engageable with the projections 32, the grooves 52 being arranged adjacently to the notched portions 51 respectively. Thus, the engaging projections 31 and 32 form the first mounting means 3 and the notched portions 51 and grooves 52 form the second mounting means 5.

Next, the mounting means 3 and 5 will be described. Since the two chain gears use the same mounting construction, reference will be made only to chain gear 1 to simplify this description.

The first mounting means 3 comprises the engaging projections 31 which are each larger in width radially of the chain gear and projections 32 which are each smaller in radial width, both the projections 31 and 32 having predetermined circumferential lengths respectively stepped portions 33 are provided between the projections 31 and 32 respectively.

Each of the notched portions 51 at the second mounting means 5 is larger in circumferential length than a sum of the length of the engaging projections 31 and 32, and has a horizontal surface of larger width than the thickness of the chain gear 1. A circle connecting the surface of a circular arc at each notched portion 51, namely, a circle around the center of shaft hole 21a, is made smaller in diameter than a circle connecting radially inner surfaces of the plurality of first projections 31, so that the surface may receive thereon the chain gear 1. Each of the grooves 52 has a slightly larger width than the thickness of the second projections 32 at the chain gear 1. A circle connecting the bottom of each groove 52, around the center of bore 21a, is smaller in diameter than a circle connecting the radially inner surfaces of the plurality of second projections 32, so that only the second projections 32 can fit into the grooves 52 respectively.

Shoulders 53 are, as shown in FIG. 5, formed at the boundary between the notched portions 51 and the grooves 52 respectively due to a difference in diameters of described circles connecting the bottoms of grooves and the surfaces of notched portions.

The shoulders 53 abut against the stepped portions 33 between the first and second projections 31 and 32 respectively, whereby the chain gear 1 is prevented by the abutment from circumferentially moving with respect to the adapter. Consequently, when the adapter 2 is rotated in the driving direction (in the arrow X direction in FIG. 5), the chain gear 1 rotates together with the adapter 2. In addition, when the adapter 2 is rotated in the reverse direction (in the arrow Y direction), the chain gear is movable with respect to the adapter 2, but the movement of chain gear 1 is not subjected to as large a torque as driving torque. Thus the chain gear 1 is held not to move in the X direction by the insertable engagement of the second projections 32 with the grooves 52. In addition, in order to prevent relative reverse movement between a chain gear and adapter in the Y direction, the chain gear 1 may be stopped by a screw attached to the adapter 2, or each of the second engaging projections 32 may be tapered in radial width toward the fore end thereof from the side of first engaging portion 31 and forced to be fitted into the groove 52 by a wedging action. Besides this, the second projections 32 are bent axially of the chain gear and forced into respective grooves 52 which further inhibits relative reverse movement.

The chain gear 1 is mounted to the adapter 2 through the mounting means 3 and 5 by placing the first and second engaging projections 31 and 32 into the notched portions 51 and rotating the chain gear 1 in the reverse direction (the arrow Y direction to FIG. 5) to the direction of rotation for driving the bicycle, whereby the second engaging projections 32 are respectively insertably engaged with the grooves 52 at the adapter 2 and the stepped portions 33 between the projections are respectively abutted against the shoulders 53 at the adapter 2.

Thus, the chain gear 1 is restrained from circumferential movement with respect to the adapter 2, by means of the abutment of the stepped portions 33 against the shoulders 53 and engagement of the second projections 32 with the grooves 52, and from axial movement by the engagement.

To complete the assembly adapter 2 is mounted to crank shaft 41 via insertion of its bore 21a thereon.

The engaging projections 31 and 32, which have different radial widths forming the stepped portions 33, may also be formed equal in width as shown in FIG. 8. In FIG. 8, an engaging projection designated by reference numeral 34 is provided which is different from the first and second projections 31 and 32 described above.

In this instance, the grooves 52 are formed in continuation of the notched portions 51 as shown in FIG. 9 and are closed at their back ends, so that the closed back end faces 54 abut against the end faces of the engaging projections 34 at the rear side thereof in the driving direction.

The arrangement for mounting the chain gear 1 to the adapter 2 is not limited to the above embodiments, but may be composed of screw threads provided at the inner peripheries of chain gears 1 and 11 and like screw threads 23a and 24a respectively provided at the outer peripheries of annular members 23 and 24. Also, a plurality of mounting tongues 35 radially extending at regular intervals and having mounting bores 35a, may be provided at the inner periphery of chain gears 1 and 11 to engage with corresponding threaded bores 23b provided on annular member 23 so that the chain gear 1 may be mounted to the adapter 2 by use of screws (not shown).

The second mounting means 5 at the adapter 2 may be provided at the legs 22 thereof. The two annular members corresponding to the two chain gears 1 and 11 respectively, may be replaced by one annular member 25 as shown in FIG. 13, the annular member 25 being larger in its outer diameter than the larger diameter chain gear 1. In this embodiment, the annular member 25 is bent axially of the chain gear 1 as shown in FIG. 14 to serve as a protector for preventing the driving chain from coming off the chain gear 1 when switched thereto.

The chain gears 1 and 11 are mounted to the adapter 2 having a single annular member through the above described mounting means provided at legs 22 of the adapter 2. Thus as shown in FIGS. 13 through 15 this embodiment has at the foremost ends of the legs 22, first mounting portions 26 which are formed of bent portions of annular member 25 and which have respective grooves 55, and at the intermediate portions of the legs 22 second mounting portions 27 which project axially of the adapter 2 and which have respective grooves 56. The chain gears 1 and 11 are provided at the inner peripheries thereof with first and second engaging projections 36 and 37 having different radial widths, whereby the second engaging projections 37, 37 are insertably engaged with the grooves 55 and 56 respectively, thus mounting the chain gears 1 and 11 to the adapter 2. The first engaging projections 36 abut against end faces of the first and second mounting portions 26 and 27 thereby restraining the chain gears 1 and 11 from moving in the reverse direction to the driving direction.

In addition, the projections 36 and 37 and associated grooves 55, 56 may be replaced by screws and associated mounting bores as earlier described.

As clearly understood from the above, the chain gear and crank of the invention are constructed that a chain gear having a large number of teeth is supported to the crank arm through an adapter having one or more annular members. Hence, the chain gear, even when made of a hard material, such as iron, can be made smaller in width from the tips of the teeth to the inner periphery producing a lightweight chain gear. Also, the adapter, even when made of a light alloy, such as an aluminum alloy, has an increased hardness due to the annular members thereby improving the durability and reducing the weight of the chain gear and crank as a whole and further resulting in a low manufacturing cost.

Furthermore, the chain gear, when gear teeth become worn or damaged, can be only readily replaced because of its detachable mounting to the adapter, thereby reducing the cost of repair or replacement.

While preferred embodiments of the invention have been described, such description is merely illustrative of the invention and it is to be understood that changes and variations may be made without departing from the spirit or scope of the invention which is defined solely by the following claims.

What is claimed is:

1. A chain gear and crank assembly for a bicycle comprising a crank arm having a shaft, a larger and a smaller diameter chain gear, said larger and smaller diameter chain gears having a different number of peripheral teeth, and an adapter for mounting said chain gears to said crank arm, each of said chain gears being formed in an annular shape and having at an inner periphery thereof engaging projections extending radially inwardly which function as first mounting means for mounting each said chain gear to said adapter, said adapter comprising a boss having a bore insertably engageable with said shaft of said crank arm, a plurality of legs extending radially outwardly from said boss, and at least one annular member connecting the radially distal ends of said legs, each of said legs having respective mounting portions for each of said chain gears, said respective mounting portions being axially offset for the respective chain gears and each containing a second mounting means comprising grooves respectively insertably engageable with said engaging projections of said first mounting means of said chain gears for fixing said chain gears axially offset from one another to said adapter, said annular member having a larger diameter than the diameter of said larger diameter chain gear and being displaced axially from said larger diameter chain gear to function as a chain guide.

2. A chain gear and crank assembly for a bicycle comprising a crank arm having a shaft, at least one chain gear, and an adapter for mounting said chain gear to said crank arm, said chain gear being formed in an annular shape and having at an inner periphery thereof engaging projections extending radially inwardly which function as first mounting means for mounting said chain gear to said adapter, said adapter comprising a boss insertably engageable with said shaft of said crank arm, a plurality of legs extending radially outwardly from said boss, and at least one annular member connecting the radially distal ends of said legs, each of said legs having mounting portions for said gear, said mounting portions containing a second mounting means comprising grooves respectively insertably engageable with said engaging projections of said first mounting means of said chain gear for fixing said chain gear to said adapter, said annular member having a larger diameter than the diameter of said chain gear and being displaced axially from said chain gear to function as a chain guide.

3. A chain gear and crank assembly for a bicycle according to claims 1 or 2, wherein each of said engaging projections at each said chain gear has a predetermined circumferential length and a width in the projecting direction, said width changing along said circumferential length.

4. A chain gear and crank assembly for a bicycle according to claims 1 or 2, wherein each of said engaging projections comprises adjacent first and second engaging projections, said first engaging projections being larger in width in the projecting direction than said second engaging projections, each of said first and second engaging projections having a respective predetermined circumferential length, each of said first and adjacent second engaging projection defining between them a stepped portion, a bottom of each of said grooves residing on a circle which is larger in diameter than a circle connecting an inner surface of each of said first engaging projections and smaller in diameter than a circle connecting an inner surface of each of said second engaging projections, said grooves having end faces with which said first engaging projections respectively abut.

* * * * *